Feb. 11, 1936.    F. A. HALLECK    2,030,063
LOADING MACHINE
Original Filed Jan. 11, 1927    7 Sheets-Sheet 1

Inventor:
Frank A. Halleck.
by Louis A. Maxson.
Atty.

Feb. 11, 1936.  F. A. HALLECK  2,030,063

LOADING MACHINE

Original Filed Jan. 11, 1927   7 Sheets-Sheet 2

Inventor:
Frank A. Halleck,
by Louis A. Maxson.
atty.

Feb. 11, 1936. F. A. HALLECK 2,030,063
LOADING MACHINE
Original Filed Jan. 11, 1927 7 Sheets-Sheet 3

Inventor:
Frank A. Halleck.
by
Louis A. Waxson.
att'y.

Feb. 11, 1936.  F. A. HALLECK  2,030,063
LOADING MACHINE
Original Filed Jan. 11, 1927   7 Sheets-Sheet 5

Inventor:
Frank A. Halleck.
by Luis A. Maxam.
atty.

Feb. 11, 1936.   F. A. HALLECK   2,030,063
LOADING MACHINE
Original Filed Jan. 11, 1927   7 Sheets-Sheet 6

Inventor:
Frank A. Halleck.
by Louis A. Maxson.
att'y.

Feb. 11, 1936.  F. A. HALLECK  2,030,063
LOADING MACHINE
Original Filed Jan. 11, 1927   7 Sheets-Sheet 7

Inventor:
Frank A. Halleck.
by Louis A. Maxson
atty.

Patented Feb. 11, 1936

2,030,063

UNITED STATES PATENT OFFICE 2,030,063

LOADING MACHINE

Frank A. Halleck, Chicago, Ill., assignor to Sullivan Machinery Company, a corporation of Massachusetts Application January 11, 1927, Serial No. 160,486
Renewed February 15, 1933

20 Claims. (Cl. 198—9)

This invention relates to loading machines, and more particularly, but not exclusively, to machines especially adapted for loading coal or other loose material.

An object of this invention is to provide an improved coal loading machine. Another object of this invention is to provide a coal loading machine having improved means for penetrating the pile of loose coal, and for raking the coal onto the nosepiece or shovel of the machine. Still another object of this invention is to provide an improved coal loading machine which is extremely simple and compact and which can be readily moved about the mine floor, and efficiently handle all grades and sizes of coal. It is a further object of this invention to provide improved means for penetrating a pile of coal, and which means cooperates with a shovel and conveyor mechanism in an improved manner. Yet another object of this invention is to provide improved means for adjusting the shovel and improved means for swinging the raking member or toothed roller. A still further object is to provide an improved tractor mounting for the loading machine whereby the track-laying treads may be utilized for propelling the machine along the mine trackway and during the loading operation. Another object of this invention is to provide a coal loading machine having improved feeding means therefor and improved controlling means for the feeding means. Still another object of this invention is to provide an improved loading machine having an improved, simplified and compact general arrangement of parts whereby the machine may operate effectively in a mine having relatively low head room. These and other objects and advantages of the improved loading machine will hereinafter more fully appear.

The invention is exemplified in the improved features of construction and novel combinations of parts, which will be hereinafter fully described and pointed out in the appended claims.

In the accompanying drawings there is shown for purposes of illustration one form which the invention may assume in practice.

In these drawings.

In this illustrative construction there is shown a loading machine especially adapted for loading loose coal or other similar material, and generally comprising a frame or body 1, mounted on endless track-laying treads 2, the frame 1 having adjustably mounted thereon at the forward end thereof a shovel or nosepiece 3 having a transverse pile penetrating edge. As shown the frame 1 has mounted thereon a circulating conveyor 4, which extends substantially the length of the machine body and terminates at its forward end within a cut-away portion or recess 7 formed within the shovel 3. Pivotally mounted on the frame 1 is a horizontally disposed toothed roller or drum 8 extending transversely of the machine in advance of the shovel 3 and which is adapted to rake or pull the coal rearwardly and downwardly onto the shovel 3. During transport of the loading machine about the mine improved adjustable wheel mountings including wheels 9 are provided and these wheels are adapted to run along a usual mine trackway 10. Adjustably mounted on the rear end of frame 1 is a tail conveyor 11 adapted to receive the coal brought back by the front conveyor 4.

Figure 14:
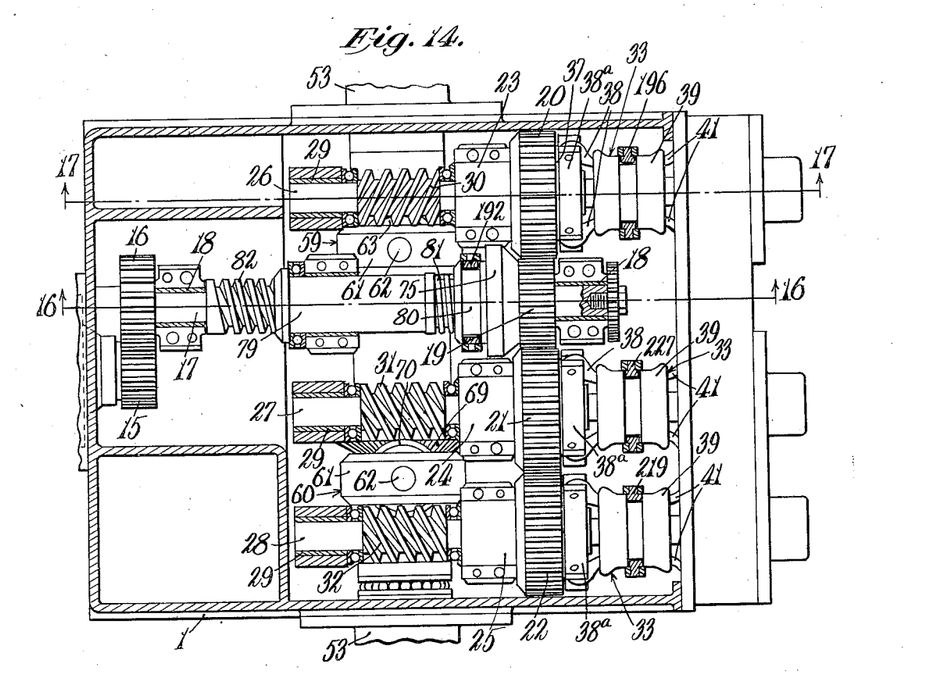
Fig. 14 is a transverse horizontal sectional view, taken on line 14—14 of Figs. 16 and 17.

In specifically describing the feeding mechanism for the machine and the controlling mechanism therefor, it will be observed that housed within the frame 1 is a motor 12 having a horizontal longitudinally extending armature shaft 13. As clearly shown in Fig. 3 the armature shaft 13 is journaled at its rear end in roller bearings 14 and this shaft has fixed thereto a spur pinion 15. The pinion 15 meshes with a spur gear 16 suitably fixed to a horizontal shaft 17 extending longitudinally of the machine and journaled in suitable bearings 18. Supported on and rotatable with the shaft 17 is a spur gear 19 which meshes with spur gears 20 and 21, the latter also meshing with a gear 22, said gears 20, 21, and 22 being respectively rotatably mounted within bearings 23, 24, and 25 suitably carried within the frame 1. Disposed coaxially with the gears 20, 21 and 22 and extending therethrough are horizontal shafts 26, 27 and 28, said shafts being arranged parallel with the shaft 17 and journaled in bearings 29 carried by the frame. The gear 21 has a greater number of teeth than either of the gears 20 or 22, which have the same number of teeth, the purpose of which will be more apparent from the description of the operation. The shafts 26, 27, and 28 have suitably fixed thereto worms 30, 31, and 32 as shown in Fig. 14. Suitable clutch mechanism is provided for connecting the gears 20, 21 and 22 to their respective shafts 26, 27 and 28, and such mechanism is herein shown as of the friction disc type mounted within the gears and having usual lever or other clutch applying mechanism 33. As these clutch mechanisms are identical in structure a description of one will suffice for all.

Figure 17:
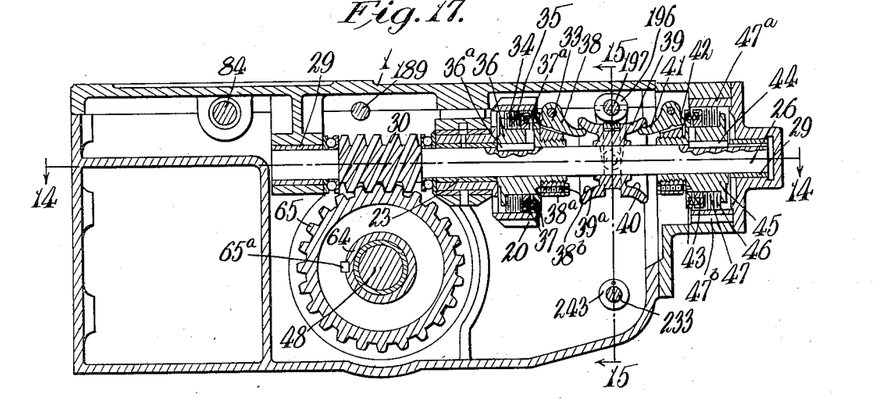
Fig. 17 is a longitudinally extending vertical sectional view, taken on line 17—17 of Figs. 8 and 14.
Figure 18:
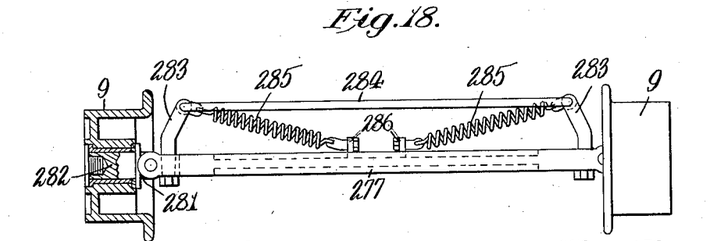
Figs. 18, 19 and 20 are detail views illustrating the improved truck wheel mountings, etc.

This clutch mechanism specifically comprises a series of friction clutch discs 34 carried by the gear 20 and these discs are interleaved with a series of clutch discs 35 carried by clutch member 36 keyed as at 36ª to the shaft 26. Encircling the hub of the member 36 are parallel plates 37 and interposed between these plates are coiled springs 37ª which cause an equal pressure to be constantly exerted on the clutch discs. Contacting with the outer plate 37 are projections or cams formed on levers 38 pivotally mounted on a supporting member 38ª secured by means of threads and a lock pin 38ᵇ to the hub of the clutch member 36. As clearly shown in Fig. 17, slidably mounted upon shaft 26 is a clutch member 39 having formed thereon a cam surface 39ª with which the outer ends of levers 38 cooperate. The shiftable member 39 has also formed thereon a cam surface 40 with which the outer ends of pivoted levers 41 cooperate, projections 42 being formed on these levers which engage the outer one of a pair of yieldably connected parallel plates 43 similar to the plates 37. Keyed as at 44 on shaft 26 is a disc supporting member 45 carrying a series of friction discs 46 which are interleaved with a series of friction discs 47 carried by a disc supporting ring 47ª keyed at 47ᵇ to the machine frame 1. The discs 46 and 47 constitute a brake for the shaft 26, for a purpose to be hereinafter fully described. Similar clutches and brakes are provided for the shafts 27 and 28. From the foregoing description it will be evident that when the member 39 is shifted axially on the shaft 26 and to the left from the position shown in Fig. 17, the cam surface 39ª will cause the levers 38 to swing inwardly, thereby forcing the clutch discs 34, 35 together and connecting the gear 20 in driving relation with the shaft 26. It will also be evident that when the member 39 is shifted in the opposite direction the cam surface 40 will cause the levers 41 to swing inwardly, forcing the friction discs 46, 47 of the brake together and thereby holding the shaft 26 against rotation. The mechanism for shifting the clutch members 39 will be later described.

Figures 3, 4, 5:
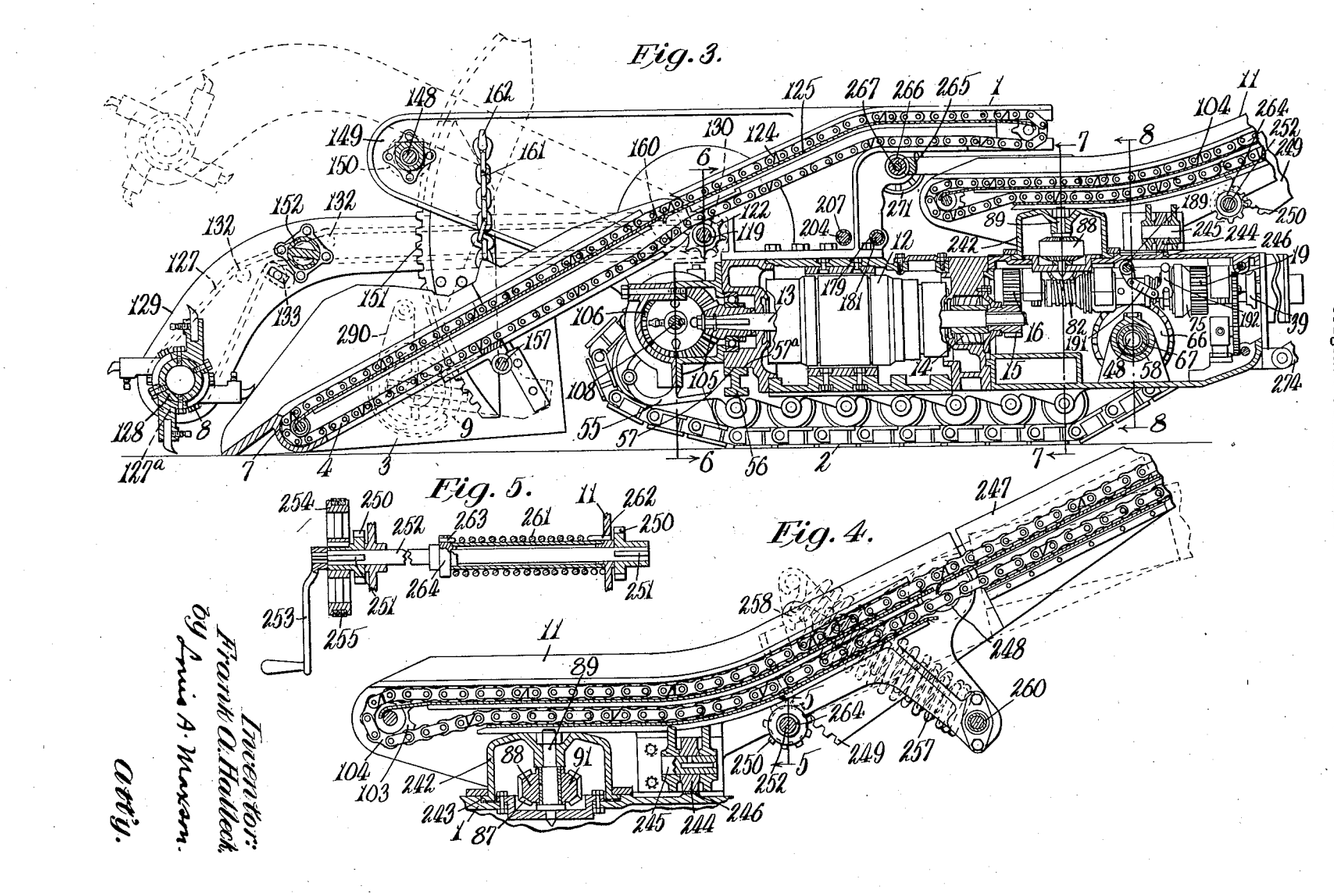
Fig. 3 is a central longitudinally extending vertical sectional view taken substantially on line 3—3 of Fig. 2, a part of the tail conveyor being omitted for simplicity.
Fig. 4 is a central longitudinally extending vertical sectional view illustrating details of the tail conveyor and its associated parts.
Fig. 5 is a detail sectional view, taken on line 5—5 of Fig. 4.
Figure 6:
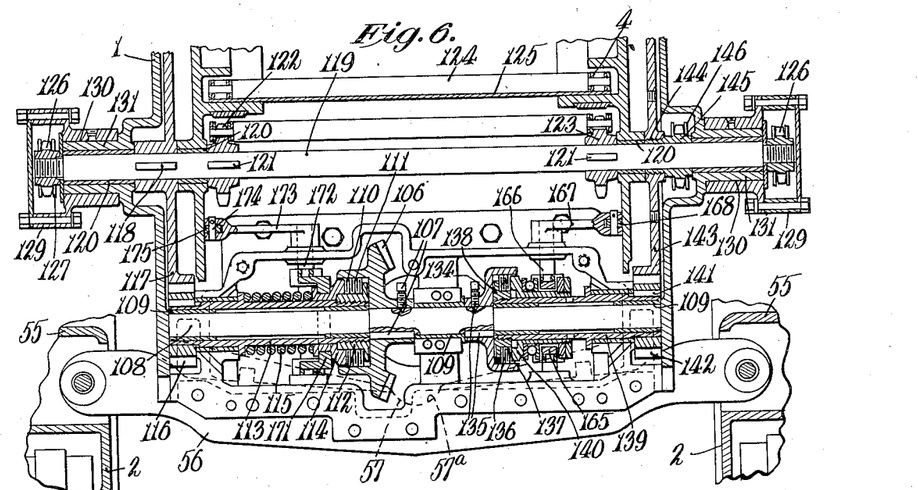
Fig. 6 is a transverse vertical sectional view, taken substantially on line 6—6 of Fig. 3, parts being omitted to facilitate illustration.
Figures 8, 9, 10, 11, 12, 13:
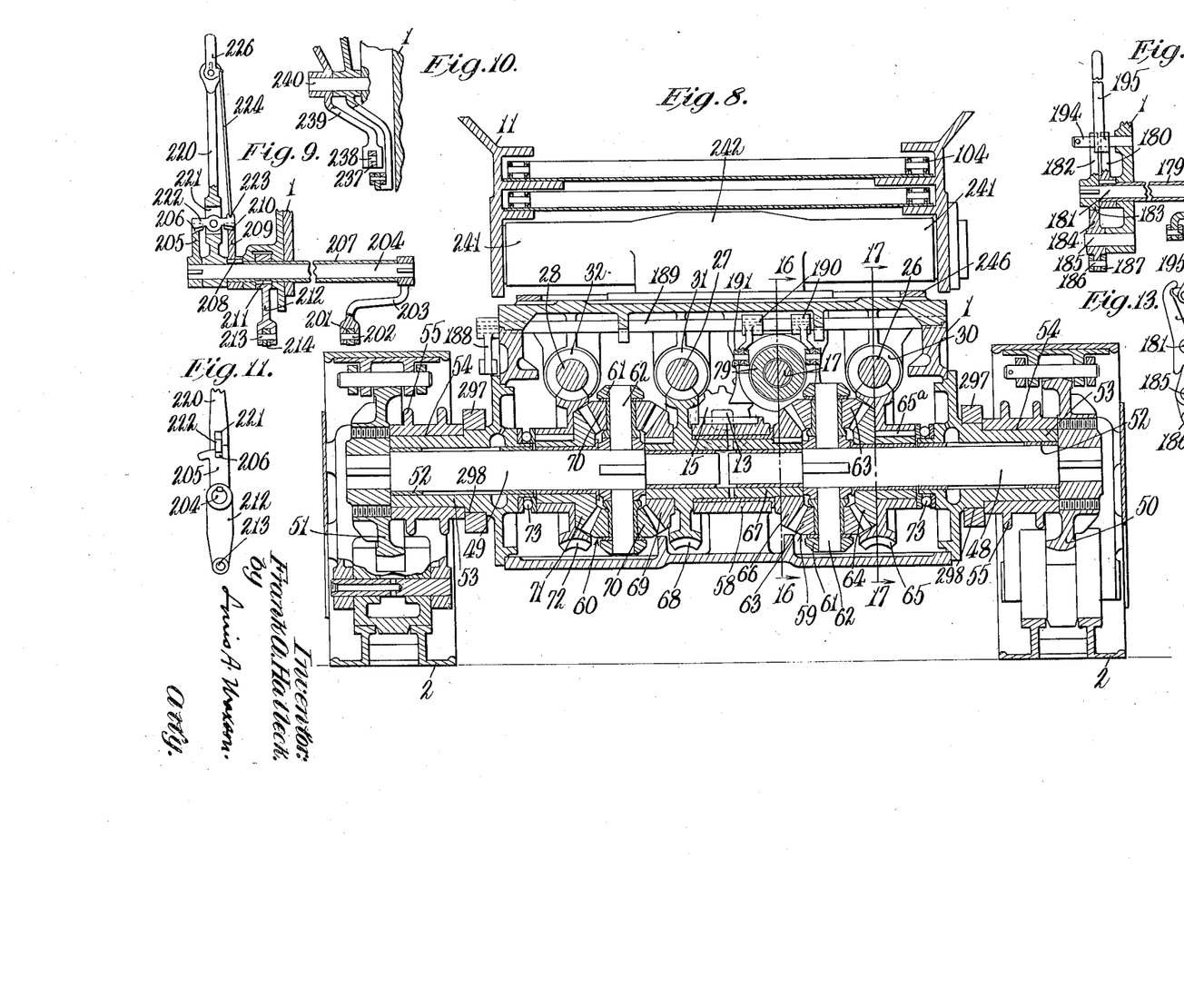
Fig. 8 is a transverse vertical sectional view, taken on line 8—8 of Figs. 1 and 3, and illustrating details of the feeding mechanism.
Figs. 9, 10 and 11 are detail views illustrating the improved controlling mechanism for the feeding mechanism.
Figs. 12 and 13 illustrate parts of the improved conveyor controlling mechanism whereby the conveyors may be simultaneously or selectively controlled.

As is clearly shown in Fig. 8 the means for driving the endless track-laying treads 2 comprises separate alined right and left hand shafts 48 and 49 which are connected to driving sprockets 50 and 51 for the right and left hand treads, said shafts 48 and 49 being journaled within bearings 52 carried by frame 1 and disposed in outwardly extending hollow trunnions 53 detachably secured to the sides of the frame. The trunnions 53 have rotatably supported thereon by bearings 54 the rear ends of parallel beams or frames 55, the forward ends of these beams being connected by a transversely extending rocker arm 56, as shown in Figs. 3 and 6. This rocker arm has formed therein, on its upper surface, an arcuate recess 57 which receives a correspondingly curved portion 57ª formed on the machine frame. The rocker arm 56 permits the loading machine to pass over uneven or rugged surfaces without in any way distorting the tread supporting structure or body.

Again referring to the specific feed gearing, it will be observed that the shafts 48 and 49 have reduced inner ends rotatably mounted in a bearing 58 carried by the lower side of the frame 1, while fixed to said shafts 48, 49 are differential mechanisms generally designated 59 and 60, the specific construction of these differentials being somewhat similar to the usual bevel gear differential mechanisms but have somewhat different connections with respect to the shafts of the driving gears than is usually had. More specifically the construction of the differential 59 comprises a spider member 61, keyed to the shaft 48, and carrying radial stub shafts 62 upon which are rotatably mounted planetary bevel pinions 63 meshing with a bevel gear 64 to which is fixed a worm gear 65 as by a key connection 65ª, said worm gear 65 meshing with the worm 30 and being driven thereby. As shown the left hand sides of the pinions 63 mesh with a bevel gear 66 fixed to a sleeve 67 rotatably mounted in the bearing 58 and having fixed thereto, on the left hand side of the bearing 58, a worm gear 68 meshing with the worm 31 and driven thereby. The differential 60 is similar in construction to the differential 59 in that it has an inner bevel gear 69 and planetary bevel pinions 70 which also mesh with a bevel gear 71, which like the bevel gear 64 has keyed thereto a worm gear 72 meshing with and driven by the worm 32. It will be noted that interposed between the inner ends of the trunnions 53 and adjacent the hubs of the worm gears 65 and 72 are ball thrust bearings 73, and these bearings receive the axial thrust of these gears.

Figure 16:
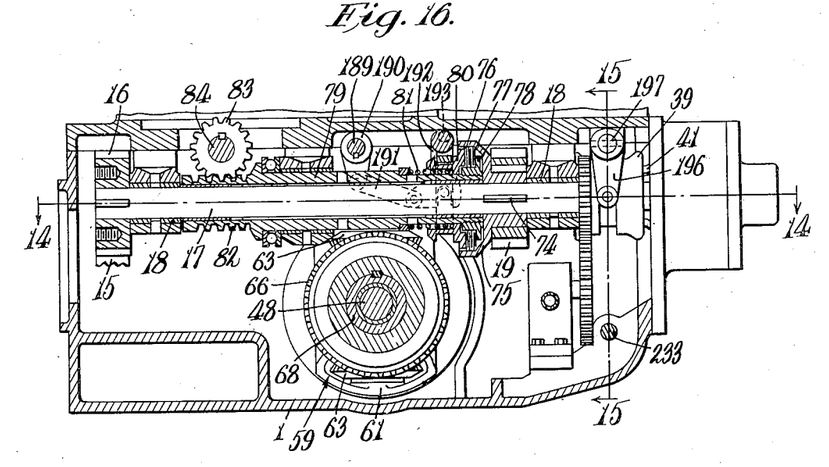
Fig. 16 is a longitudinally extending sectional view taken on line 16—16 of Figs. 8 and 14.

In specifically describing the improved mechanism for driving the tail conveyor 11 it will be observed that fixed at 74 (see Fig. 16) to the shaft 17 is a clutch housing 75, carrying a series of clutch discs 76 which are interleaved with a series of clutch discs 77 carried by a clutch member 78 connected to a sleeve 79 surrounding the shaft 17 and suitably journaled within the machine frame. Surrounding the rear end of the sleeve 79 and movable thereon adjacent to the clutch housing 75 is a clutch applying member 80 normally resiliently held in clutch applying position by a coil spring 81. The actuating means for the clutch applying member 80 will be later described. The sleeve 79 has preferably formed integral therewith a worm 82 which meshes with a worm gear 83 fixed to a horizontal transversely extending shaft 84 (see also Fig. 7) journaled in bearings 85 suitably carried by the machine frame. The shaft 84 has preferably formed integral therewith a bevel pinion 86 which meshes with beveled teeth 87 formed on the lower side of a double bevel gear 88 rotatably mounted on a vertical shaft 89. A bracket 90 is also provided for supporting the inner end of the shaft 84. Meshing with beveled teeth 91 on the upper side of the gear 88 is a bevel gear 92 fixed to the inner end of a horizontal plural-part shaft 93 journaled as at 94 within the frame.

In accordance with this illustrative embodiment of the invention there is shown a toothed clutch member 95 (see Fig. 7) keyed as at 96 to and slidable on the outer end of the shaft 93. A coiled spring 97 surrounds the hub of the member 95 and acts between this member and a reaction plate 98 secured as by a screw connection 99 to the shaft 93, and consequently the clutch member 95 is yieldably pressed into engagement with a toothed clutch member 100 rotatably mounted on the shaft 93. The clutch member 100 carries a sprocket 101. The teeth on these clutch members 95 and 100 are of the jaw clutch type, the inclined mating surfaces thereon being adapted to automatically release when the driving connections are overloaded, consequently permitting no damage to the conveyor mechanism as a result of such overload. The sprocket 101 is connected through an endless chain connection 102 (see Fig. 1) to a driving sprocket 103 which drives the conveyor chain 104 of the tail conveyor 11 (see also Fig. 4).

Improved mechanism is provided for driving the front conveyor 4, for actuating the toothed roller, for swinging the toothed roller about its pivot, and for adjusting the shovel 3, and such mechanism specifically comprises a bevel pinion 105 rigidly secured to the forward end of the armature shaft 18 (see Figs. 3 and 6) and this bevel pinion meshes with a larger bevel gear 106 fixed as by a key and screw connection 107 to a horizontal transversely extending shaft 108, the latter being journaled in bearings 109 suitably carried within the machine frame. The bevel gear 106 is made hollow and carries therein a series of clutch discs 110 which are interleaved with a series of clutch discs 111 carried by a clutch member 112 fixed to a sleeve 113 surrounding the shaft 108 and rotatably mounted on the frame. Mounted on and slidable axially relative to the sleeve 113 is a clutch applying member 114 normally held in clutch applying position by means of coiled spring 115.

As clearly shown in Fig. 6 the sleeve 113 has fixed thereto a spur pinion 116 which meshes with larger spur gear 117, keyed at 118 to a horizontal transversely extending shaft 119 journaled in bearings 120 carried by the machine frame. Fixed as at 121 to the shaft 119 and spaced longitudinally thereof are sprockets 122 and 123, which cooperate with and drive the front conveyor 4, the latter being adapted to be circulated within suitable guides formed on the adjustable shovel 3 and on the machine frame, this conveyor 4 constituting side chains meshing with sprockets 122 and 123 and transverse scrapers 124 which are movable along a transverse plate 125. Also secured to the shaft 119 at its ends are sprockets 126 which are connected through endless chain connections 127 to sprockets 127ᵃ suitably fixed to the transverse supporting shaft 128 for the toothed roller 8. It will be here noted that the drive chain 127 is guided within hollow parallel arms 129, which support at their forward ends the toothed roller 8, and these arms are pivoted at their rear ends as at 130 on outwardly extending trunnions 131 (see Fig. 6) carried by the sides of the machine frame. As indicated by dotted lines in Fig. 3, idler rolls 132 are provided for guiding the drive chains 127, while also cooperating with each drive chain is an adjustably mounted roller 133. These latter rollers are utilized to vary the tension of the chains 127 in an obvious manner. From the foregoing description it will be evident that when the clutch 110, 111 is applied and the motor running, the toothed roller is rotated and the front conveyor chain is circulated within its guides. The mechanism for controlling the clutch applying member 114 will be later described.

Figures 20, 21:
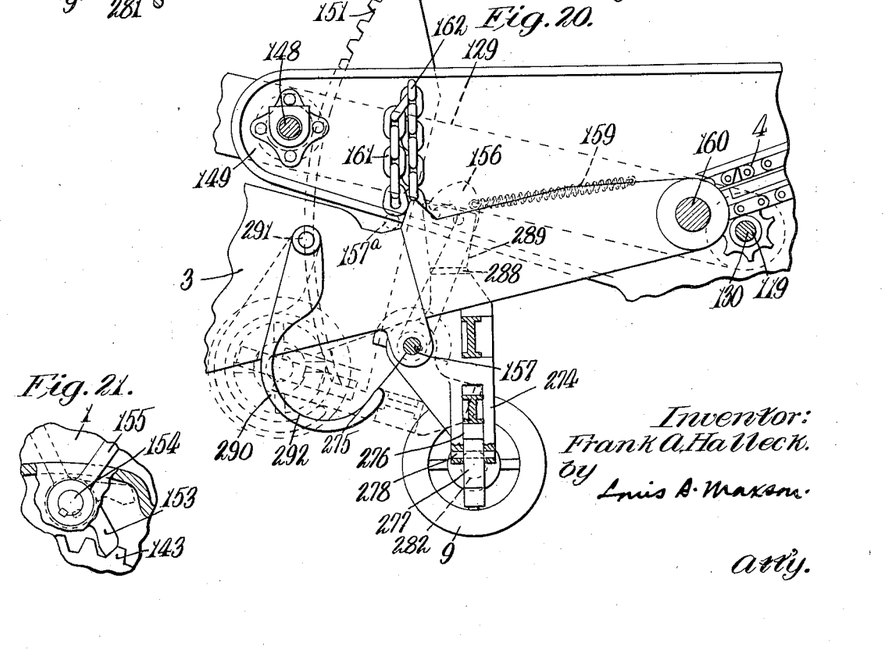
Fig. 21 is a detail sectional view, parts being shown in elevation, illustrating the lock for maintaining the toothed roller in its adjusted positions.

As previously pointed out the toothed roller is mounted for swinging movement and the mechanism for swinging this roller specifically comprises a clutch housing 134, secured as by a key and screw connection 135 (see Fig. 6) to the shaft 108, and this clutch housing carries therein a series of clutch discs 136 which are interleaved with a series of clutch discs 137 carried by a clutch member 138 fixed to the inner end of a sleeve 139 surrounding the shaft 108 and suitably journaled on the machine frame. As illustrated, surrounding the sleeve 139 is a clutch applying member 140, while keyed to the outer end of this sleeve as at 141 is a spur pinion 142 meshing with a larger spur gear 143 fixed as at 144 to the hub portion of a sprocket 145 rotatably mounted on the shaft 119. The sprocket 145 is connected through an endless chain connection 146 (see Fig. 1) to a sprocket 147, fixed to a horizontal transversely extending shaft 148, the latter being journaled in the forward ends of forwardly projecting side portions 149 on the machine frame. In this instance the shaft 148 has fixed thereto spur pinions 150 (see Fig. 2) and these pinions mesh with arcuate toothed members or gear segments 151, suitably rigidly secured to the inner sides of the parallel arms 129. Secured to the inner sides of the parallel arms 129 is a transversely extending bracing rod 152 (see Figs. 2 and 3). From the foregoing description it will be evident that when the clutch 136, 137 is applied the pinions 150 will be rotated, and the arms 129 and the toothed roller 8 will be swung upwardly about their pivot. It will also be noted that when the clutch 136, 137 is released the toothed roller may "float or ride" upon the pile of coal or other material to be loaded, the roller moving upwardly and downwardly over the coal pile. However, in certain instances it has been found desirable to so control the toothed roller in such manner as to prevent its entire weight from resting on the coal, it having been found that the entire weight of the roller crushed the coal. When the toothed roller 8 is in raised position, it is adapted to be locked against downward movement, and this locking means comprises a dog or pawl 153 (see Fig. 21) adapted to engage the teeth of the gear 143, the dog being suitably secured to a shaft 154. This shaft has fixed thereto at the outer end thereof an operating handle 155.

Figures 1, 2, 23:
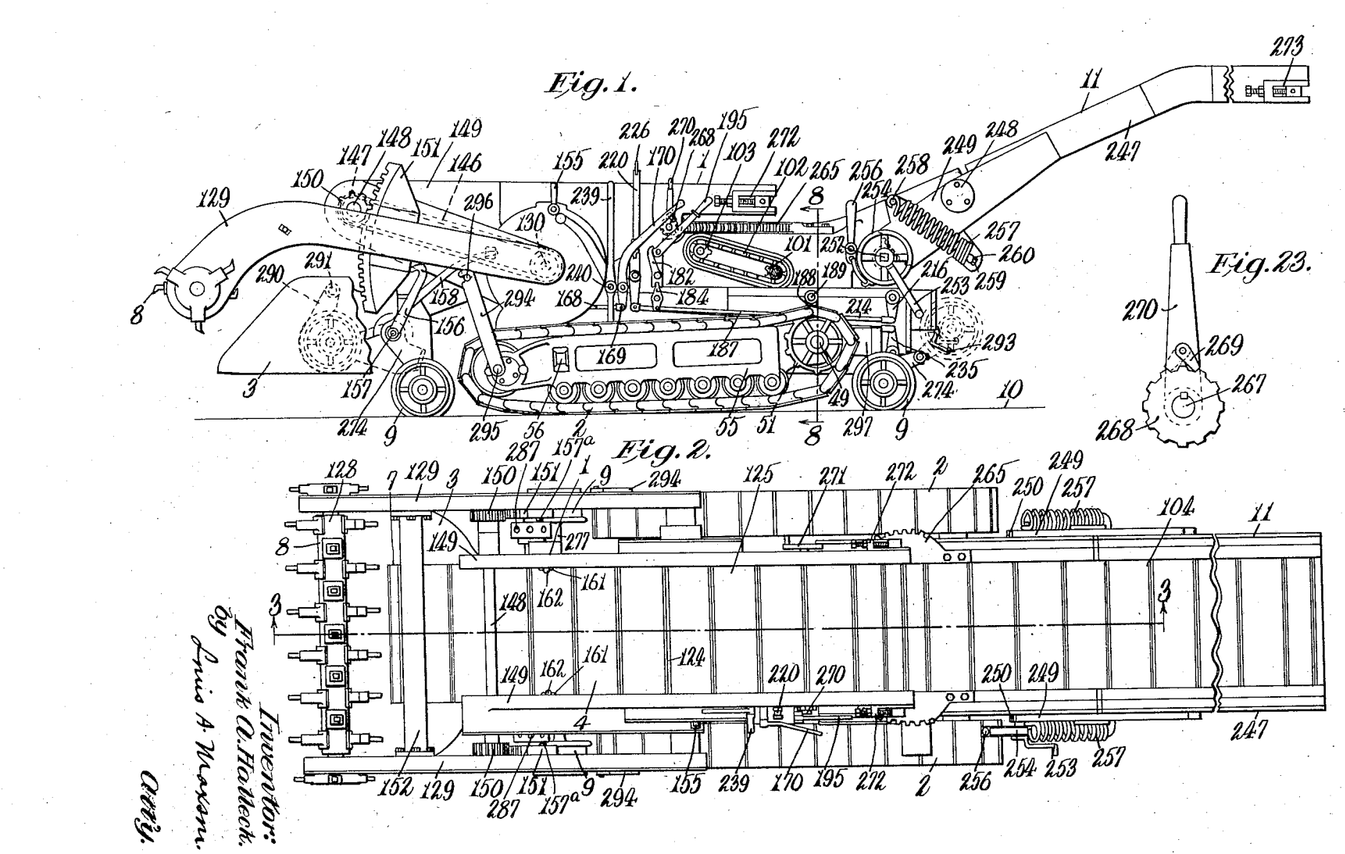
Fig. 1 is a side elevation of the improved coal loading machine, parts being broken away to facilitate illustration.
Fig. 2 is a plan view of the machine shown in Fig. 1.
Fig. 23 is a detail of the ratchet device for swinging the tail conveyor.
Figure 19:
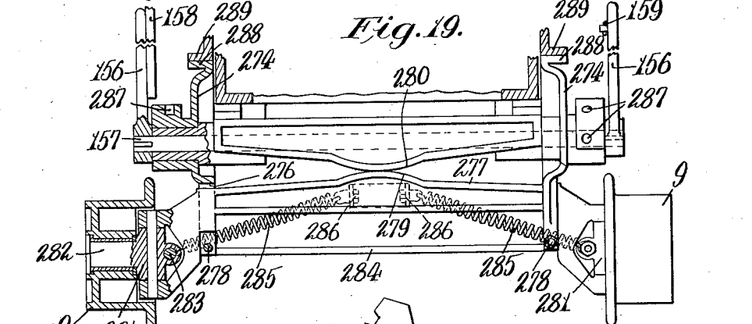

When it is desired to move the loading machine about the mine, the shovel 3 is lifted from the position shown in Fig. 3 to the position shown in Fig. 1, and the mechanism for accomplishing this adjustment comprises hooks 156 mounted for swinging movement on a horizontal transversely extending shaft 157 fixed to the sides of shovel 3, and these hooks are adapted to be connected to laterally projecting pins or lugs 157a carried by the arms 129 (see Fig. 19). Fixed to one of the hooks 156 is an operating lever 158, while a coiled spring 159 normally maintains the hooks in their released position. When it is desired to raise the shovel 3 from the mine bottom the operator grasps the lever 158 and swings the hooks 156 forward into engagement with the lateral pins 157a on the arms. Upon application of the clutch 136, 137 the arms 129 may be swung upwardly, consequently swinging the shovel member 3 about its pivot 160. To prevent excessive downward movement of the shovel 3 the same has connected thereto loose-link chains 161 which are adapted to be connected at their free ends to hooks 162 on the inner sides of the projecting portions 149 of the machine frame 1.

The actuating means for applying or releasing the feed controlling clutches 34 and 35 and the brakes 46, 117, the tail conveyor controlling clutch 76, 77, the clutch 110, 111, for controlling the actuating means for the front conveyor 4 and for rotating the toothed roller 8, and for applying and releasing the clutch 136 and 137 for controlling the swinging of the toothed roller and for raising or lowering the shovel, will now be described. The controlling mechanism for the clutch 136, 137 comprises a pivoted shipper yoke 165, secured to a vertical shaft 166 rotatably mounted on the machine frame and having secured thereto a crank or arm 167. The arm 167 has pivotally connected thereto a reciprocable actuating or pull rod 168 extending rearwardly longitudinally of the machine and being pivotally connected as at 169 to the lower end of a pivoted operating lever 170 (see Fig. 1). Cooperating with the clutch applying member 114 for the clutch 110, 111 is a shipper yoke 171, secured to a vertical shaft 172 mounted on the machine frame, and this shaft has secured thereto a crank or arm 173. The arm 173 is connected at its outer end at 174 to a reciprocable actuating rod 175 extending rearwardly longitudinally of the machine at the opposite side thereof from the rod 168, and is pivotally connected at its rear end at 176 to a crank 177 secured as at 178 to a sleeve 179, the latter being rotatably mounted on the sides of the machine frame. The sleeve 179 has secured thereto, at the end thereof opposite from the crank 177, a lever 180 (see Fig. 12). Arranged coaxially with the sleeve 179 is a shaft 181, and fixed thereto is a lever 182, similar to the lever 180. As clearly shown in Fig. 13 the lever 182 has formed thereon a bifurcated portion 183, and projecting within this portion is a lever 184 pivoted at 185 on a horizontal axis on the frame 1. Also pivotally connected to the lever 184 at 186 is an actuating rod 187 extending rearwardly longitudinally of the machine and being pivotally connected to an arm 188, fixed to a horizontal transversely extending actuating rod 189 (see Fig. 1). The rod 189 also has secured thereto arms 190 (see Fig. 16) connected through links 191 to a clutch yoke 192 pivoted at 193 on the machine frame and cooperating with the applying member 80 for the controlling clutch 76, 77 for the tail conveyor 104.

Referring to Figs. 12 and 13 it will be observed that fixed to the side of the frame 1 is a laterally projecting pin 194 which has pivotally mounted thereon a lever 195. The lever 195 is also adapted to be slid longitudinally of the pin 194. When the lever 195 is in the position shown in Fig. 12 and the operator swings the same, it will be obvious that the levers 180 and 182 will also be swung and consequently the clutches 76, 77 and 110, 111 will be simultaneously applied and the conveyors 4 and 104 simultaneously actuated. If it is desired to actuate the levers 180, 182 selectively, the operator may slide the lever 195 axially on the pin 194 so that when the lever is swung only one or the other of the levers is engaged thereby. From the foregoing description it will be evident that the front and tail conveyors may be simultaneously or selectively operated at the will of the operator.

Figure 15:
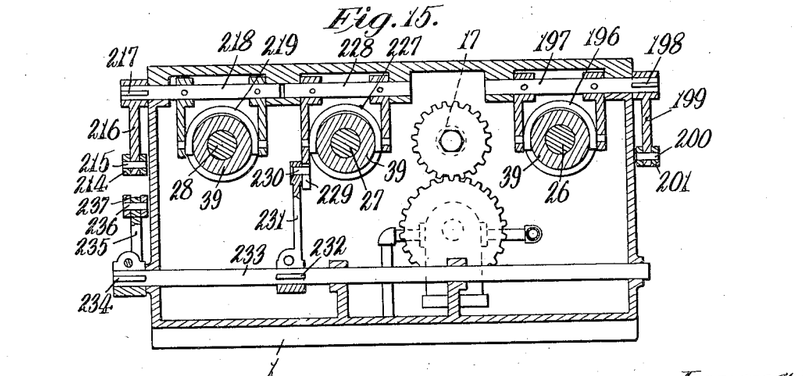
Fig. 15 is a transverse vertical sectional view, taken substantially on line 15—15 of Figs. 16 and 17.

As shown in Fig. 15 the actuating mechanism for the feed controlling clutches and brakes comprises a shipper yoke 196 fixed to a horizontal transversely extending actuating rod 197, the latter having secured thereto at 198 a crank 199. The crank 199 has pivotally connected thereto at its lower end at 200, an actuating rod 201 extending longitudinally of the machine, and which is pivotally connected as at 202 to a crank 203 (see Fig. 9), keyed to a horizontal shaft 204 extending transversely of and journaled on the machine frame, and this shaft has fixed thereto, at its opposite end, an arm 205 having formed in the upper surface thereof a notch 206. As shown in Fig. 9 the shaft 204 has arranged coaxially therewith a rotatable sleeve 207 having fixed thereto at 208 an arm 209 and this arm has a notch 210 and is identical to the arm 205. The sleeve 207 has fixed thereto as at 211 a depending crank 212 having pivotally connected thereto as at 213 an actuating rod 214 extending rearwardly longitudinally of the machine and being pivotally connected at the rear end as at 215 (see Fig. 15) to the lower end of a crank 216 fixed as at 217 to the outer end of a horizontal transversely extending rod 218 rotatably mounted within the machine frame. The rod 218 has fixed thereto a shipper yoke 219 cooperating with the clutch actuating member 39 for the gear 22. Again referring to Fig. 9 it will be observed that pivotally mounted on the rod 204, between the arms 205 and 209, is an operating lever 220 having an opening 221 within which a transverse pivoted lever 222 is arranged. Pivotally connected at 223 to the lever 222 is a controlling rod 224 connected at its opposite end to a pivoted latch member 226. The lever 222 is adapted to cooperate with the notches 206, 210 in the arms 205 and 209 respectively.

It will be evident from the foregoing description that when the lever 222 is in the position in Fig. 9, that is in engagement with both notches 206, 210, and when the operator swings the lever 220, the arms 205 and 209 will be also swung, and consequently the clutches controlling the connection of the gears 20 and 22 to the shafts 26 and 28, respectively, will be applied, and the worm gears 65 and 72 will be simultaneously rotated. The operator then applies the brake 46, 47 preventing rotation of shaft 27, and consequently rotation of the worm 31 and worm gear 68 is prevented. Also, the bevel gears 66 and 69 will be held against rotation, and the planetary pinions 63 and 70 will react on and roll around these stationary bevel gears, thereby effecting rotation of the shafts 48 and 49 simultaneously at a relatively high speed, and feeding the machine forwardly at such speed. When it is desired to turn the machine, the track-laying treads are separately operated, the operator swinging the latch 226 in one direction or the other about its pivot, thereby connecting one or the other of the cranks 205, 209 to the lever 229.

The mechanism for actuating the applying member for the clutch and brake for the shaft 27 comprises a shipper yoke 227 cooperating with the shiftable member 39 and fixed to a horizontal shaft 228 alined with the shaft 218. The lower end of the shipper yoke has a slot 229 within which a pin 230 carried by a crank 231 cooperates, and this crank is fixed at 232 to a horizontal actuating rod 233 extending transversely of the machine and journaled thereon. Fixed as at 234 to the rod 233 is a crank 235 pivotally connected at its upper end at 236 to an actuating rod 237, the latter extending forwardly longitudinally of the machine. The forward end of the rod 237 is pivotally connected at 238 to the lower end of a lever 239 pivoted as at 240 on the side of the machine frame. (See Fig. 10.) It will be seen that when the operator swings the lever 239 in one direction or the other either the clutch 34, 35 controlling the connection of the gear 21 to shaft 27 or the friction brake for braking rotation of shaft 27 will be applied. When the clutch 34, 35 is applied the worm 31 is connected to the shaft 27 and upon application of the brakes on shafts 26 and 28 the machine may be fed rearwardly at a fast speed. If it is desired to feed the machine forwardly at a slow speed, the operator applies the friction clutch 34, 35 thereby connecting the gears 20, 22 respectively to the shafts 26, 28, and also swings the lever 239 to apply the clutch for connecting the gear 21 to the shaft 27 and consequently the worm gears 65 and 72 are simultaneously rotated at a relatively high speed in one direction while the worm gear 68 is rotated at a slightly slower speed in the opposite direction, the difference in speed of the gears 65, 72, and 68 being due to the difference in the number of teeth on the gears 20, 22, and 21. Therefore, it will be observed that the bevel gears 64 and 71 will be rotated in one direction while bevel gears 66 and 69 will be rotated in the opposite direction at a slower speed, and the planetary pinions and shafts 48 and 49 are consequently rotated at a relatively slow speed and the machine fed forwardly at such speed.

Figure 7:
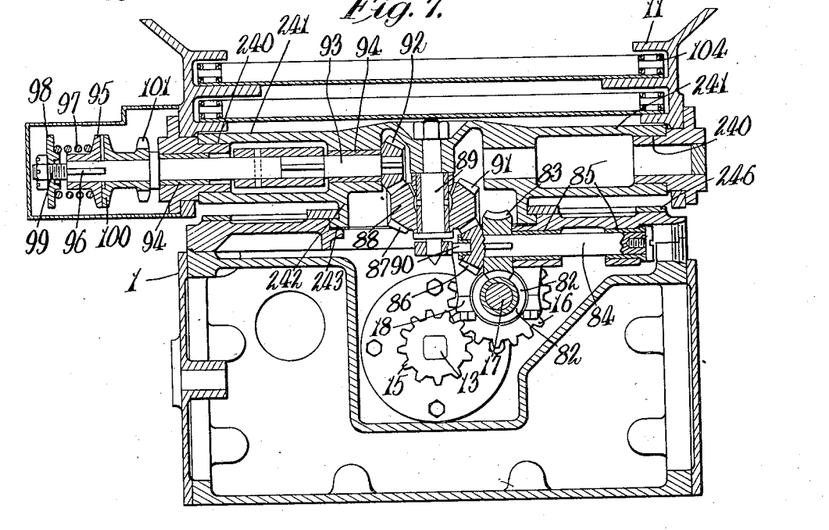
Fig. 7 is a transverse vertical sectional view, taken on line 7—7 of Fig. 3, parts being omitted to facilitate illustration.

Referring to Figs. 4, 5 and 7, it will be observed that the tail conveyor 11 is pivotally mounted as at 240 on horizontal trunnions 241 integral with a rotatable turret member 242 guided as at 243 on the machine frame 1 for rotation about a vertical axis. It will be noted that the turret member 243 has secured thereto the vertical shaft 89. The tail conveyor 11 also carries a plurality of rollers 244 mounted on shafts 245 carried by the conveyor frame, and these rollers are adapted to roll around a circular trackway 246 arranged concentrically with the axis of horizontal swinging movement of the tail conveyor. As illustrated the tail conveyor 11 has a tiltable portion 247, pivoted as at 248 on a horizontal axis, and this tiltable portion 247 has formed thereon an arcuately arranged toothed or gear segment 249 with which pinions 250 mesh, the latter being secured as at 251 to a horizontal transversely extending shaft 252 journaled on the tail conveyor frame. As shown in Fig. 5 the shaft 252 has secured thereto an operating crank 253 while secured to the hub of one of the spur pinions 250 is a brake drum 254. Cooperating with this brake drum is a brake band 255 having an operating lever 256. This brake is adapted to lock the spur pinions against rotation thereby to maintain the tiltable portion 247 of the tail conveyor in its different adjusted positions. As shown, coiled springs 257 are provided at each side of the tail conveyor, and each spring is attached at one end thereof at 258 to the tilting portion 247, and at the other end thereof at 259 to a transverse brace rod 260 carried by the non-tiltable portion of the conveyor. These springs constantly urge the tiltable portion of the tail conveyor into its extreme elevated position and consequently facilitate the upward tilting thereof. To augment the spring 257 a coiled spring 261 is provided surrounding the shaft 252 and having one end thereof secured at 262 to the conveyor frame and the other end thereof secured at 263 to an adjustable collar 264 secured to the shaft 252. To swing the tail conveyor laterally about its vertical axis a worm tooth rack or gear segment 265 is suitably secured to the tail conveyor frame, and meshing with the teeth on this rack is a worm 266 suitably secured to a horizontal transversely extending shaft 267 suitably journaled on the conveyor frame. This shaft has fixed thereto a ratchet 268 with which a reversible pawl or dog 269 cooperates, the dog being carried by a lever 270 (see Fig. 23). The other end of the shaft 267, at the side of the machine opposite from the ratchet, has fixed thereto a hand wheel 271. It will be obvious that when the worm 266 is rotated in one direction or the other, the tail conveyor may be swung laterally in either direction. Suitable adjusting devices 272 and 273 are also provided for adjusting the conveyor chains of the front and tail conveyors, respectively.

Improved adjustable mountings are provided for the truck wheels 9, and these mountings comprise arms 274, the arms for the front wheels being pivoted on the horizontal shaft 157 as at 275. The rear arms are pivoted on the body of the machine. These arms are slotted at 276, and these slots receive transverse axles 277, the axles being retained in the slots by bolts 278. In this instance the axles 277 have formed thereon, intermediate their ends, curved upper surfaces 279, which engage curved surfaces 280 formed on the frame. It will be obvious that the axles may tilt vertically about the curved surfaces 279, 280, the bolts 278 preventing excessive tilting movement of the axles. Pivotally connected to the ends of these axles are brackets 281 having stub shafts 282 on which the wheels 9 are journaled, and each of these brackets carries a projecting arm 283. The arms 283 of each pair of wheels are connected by a transverse tie rod 284 for maintaining the truck wheels in alinement. Coiled springs 285 are connected at one end to the arms 283 and at the other end to the axles at 286 for holding the wheels straight. As the loading machine runs along the trackway around corners, the springs 285 yield sufficiently to permit the wheels to turn slightly. The upper part of each of the arms 274 has formed therein a series of apertures 287 which are adapted to receive a lever or bar to enable the operator to rock the wheels about their pivots into their operative position, stop lugs 288 formed on the arms 274 cooperating with lugs 289 formed on the frame at that time. The arms 274 for the front wheels are adapted to be held in elevated position by means of hooks 290, pivoted at 291 on the shovel and having engaging portions 292 which embrace the treads of the wheels. A hook 293 is carried by the machine body and is connectible to the rear axle for holding the rear wheels 9 in their raised or inoperative position. (See Fig. 1.)

Figure 22:
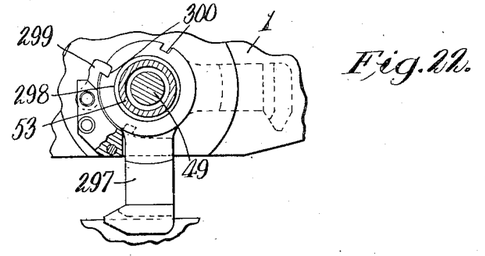
Fig. 22 is a detail view illustrating the rail guide, the guide being shown in a plurality of positions.

The track-laying treads 2 are adjustable vertically, and to accomplish such adjustment hooks 294 are pivoted at 295 to the tread frame, and these hooks are engageable with lateral pins 296 carried by the supporting arms 129 for the toothed roller. It will be evident that when the roller is elevated and the hooks 294 connected to the pins 296, the treads are also elevated and the machine is supported wholly by the truck wheels at that time. It will be also seen that the treads may be lowered by the roller supporting arms 129 into contact with the track rails, thereby enabling the treads to propel the machine about the mine trackway. If desired, however, the rear truck may be detached from the frame and the rear end of the machine will then be supported by the treads. When the machine is supported in this manner flanged guide members 297 (see Fig. 22) pivoted on the frame at 298 are swung downwardly with the flanges thereon engaging the sides of the rails, thereby preventing the treads from slipping laterally from the track. Suitable locking latch means is provided for maintaining guide members 297 in their operative and inoperative positions as indicated at 299, this latch being engageable with locking recesses 300 on the members 297.

The general operation of the improved coal loading machine is as follows: As previously pointed out the machine may travel about the mine under its own power and propelled by the track-laying treads 2, or may be hauled about the mine when wholly supported by the truck wheels 9. During transport the treads may be connected to the roller supporting arms 129 by means of the hooks 294 and these arms may be swung upwardly to elevate the treads or to control the amount of contact thereof with the track rails. When the coal face or coal pile is reached the truck wheels 9 are hooked up under the shovel 3 and the hooks 294 are disconnected from the arms 129 and the machine is fed forwardly by the treads 2 at a high speed until the shovel 3 has penetrated the pile, the toothed roller being elevated and locked at that time. After the shovel has penetrated the coal a sufficient distance, the roller lock is released, and the coal is raked down by the roller onto the conveyor 4. In certain instances it has been found desirable to utilize the toothed roller as an undercutter and as a means for breaking the coal to suitable size. During this undercutting operation the machine may be fed forwardly at a slow speed, such speed also being utilized during certain of the loading operations. When it is desired to retract the machine from the coal it is fed rearwardly at a relatively high speed. Furthermore, if it is desired to raise the shovel 3 from the mine floor the hooks 156 are again connected to the arms 129 of the toothed roller and the latter swung upwardly. These and other operations of the improved coal loading machine will be clearly apparent to those skilled in this art.

While I have in this application specifically described one form which my invention may assume in practice, it will be understood that this form of the same has been shown for purposes of illustration and that the invention may be modified and embodied in various other forms without departing from its spirit or the scope of the appended claims.

What I claim as new and desire to secure by Letters Patent is:

1. A loading machine comprising a portable body, a tractor mounting for said body, the latter being movably mounted thereon, a shovel member mounted on said body, means for supporting said body with said tractor mounting out of contact with the mine floor comprising truck wheels carried by said body and shovel member, said wheels being adapted to run along a trackway, a rotary raking device pivotally mounted on said body and cooperating with said shovel member for moving the material to be loaded thereon, and means for connecting said tractor mounting to said raking device for movement therewith in such manner as to permit contact of the tracklaying treads of said tractor mounting with the track rails to effect propulsion of the loading machine while supported on said truck wheels.

2. A loading machine comprising a body supported on tracklaying treads and a mounting for said treads movable relative to said body, a shovel member carried by said body, means for supporting said body with said treads in elevated position comprising truck wheels carried by said body and said shovel member, said wheels being adapted to run along a trackway, a rotary raking device pivotally mounted on said body and cooperating with said shovel member for moving the material to be loaded thereon, and means for connecting said tread mounting to said raking device for movement therewith in such manner as to permit the lowering of said treads into contact with the track rails to effect propulsion of the loading machine while supported on said truck wheels.

3. A loading machine comprising a body supported on tracklaying treads and a mounting for said treads movable relative to said body, means for supporting the machine with said treads in elevated position out of contact with the mine floor comprising truck wheels carried by said body adapted to run along a trackway, a conveyor carried by said body, means movably mounted on said body and cooperating with said conveyor for moving the material to be loaded thereon, and means for connecting said tread mounting to said material moving means for movement therewith in such manner as to permit the treads to be lowered into contact with the track rails to effect propulsion of the machine along the trackway.

4. A loading machine comprising a body supported on tracklaying treads and a mounting for said treads movable relative to said body, a shovel member pivotally mounted on said body, a rotary raking device pivotally mounted on said body cooperating with said shovel member for moving the material to be loaded thereon, means for supporting the machine with said tracklaying treads in elevated position out of contact with the mine floor comprising truck wheels carried by said body and by said shovel member and adapted to run along a trackway, and means for connecting said tread mounting to said rotary device for swinging movement therewith in such manner as to permit the treads to be lowered into contact with the track rails for effecting propulsion of the machine along the trackway while supported on said truck wheels.

5. A loading machine comprising a body supported on tracklaying treads and a mounting for said treads movable relative to said body, a shovel member pivotally mounted on said body, a rotary raking device pivotally mounted on said body and cooperating with said shovel member for moving the material to be loaded thereon, means for supporting the machine with said tracklaying treads in elevated position out of contact with the mine floor comprising truck wheels carried by said body and by said shovel member and adapted to run along a trackway, means for connecting said tread mounting to said rotary device for swinging movement therewith in such manner as to permit the treads to be lowered into contact with the track rails for effecting propulsion of the machine along the trackway while supported on said truck wheels, and means for connecting said shovel member to said rotary device for movement therewith to effect raising and lowering of said shovel member.

6. A loading machine comprising a portable body, a tractor mounting for said body including endless traction treads, truck wheels adapted to run along a trackway for supporting the forward end of said body while the rear end thereof is supported on the trackway by said treads with the latter in engagement with the trackway, and means for guiding the rear end of said body to prevent lateral movement of the treads relative to the trackway including guide members engaging the rails of the trackway.

7. A loading machine comprising a portable body, a tractor mounting for said body including endless traction treads, truck wheels adapted to run along a trackway for supporting the forward end of said body while the rear end thereof is supported on the trackway by said treads with the latter in engagement with the trackway, and means for guiding the rear end of said body to prevent lateral movement of said treads relative to the trackway including pivoted guide members swingable into engagement with the rails of the trackway.

8. In a loading machine, a portable body, a tractor mounting for said body, a shovel pivotally connected to said body, a wheel mounting for said body and tractor mounting for supporting said body together with said tractor mounting in an elevated position including truck wheels carried by said body and shovel and adapted to run along a trackway, the truck wheels carried by said shovel having a mounting pivotally connected to said shovel and swingable into operative and inoperative positions relative thereto, and a member pivoted on said shovel for holding said pivoted wheel mounting in one position.

9. In a loading machine, a portable body, a tractor mounting for said body, a shovel pivotally connected to said body, and a wheel mounting for said body and tractor mounting adapted to support said body together with said tractor mounting in an elevated position including truck wheels carried by said body and shovel and adapted to run along a trackway, said truck wheels having mountings pivotally connected to said shovel and body respectively and swingable into operative and inoperative positions, and members pivoted on said shovel and body for respectively holding said pivoted truck wheel mountings in their inoperative position.

10. A loading machine comprising a body and supporting means for the body providing mobility therefor, said body having a gathering conveyor extending upwardly from a point in advance thereof and towards the top of said body and including upper and lower runs, a transversely extending shaft on said body, means supported by said body for driving said shaft, driving connections between said shaft and the lower run of said gathering conveyor, and a supplementary gathering device having supporting arms journaled coaxially with said shaft and having driving connections extending through said arms and having a driving element on said shaft.

11. A loading machine comprising a body and supporting means for the body providing mobility therefor, said body having a gathering conveyor extending upwardly from a point in advance thereof and towards the top of said body and including upper and lower runs, a transversely extending shaft on said body extending underneath said conveyor, means supported by said body for driving said shaft, driving connections between said shaft and the lower run of said gathering conveyor, a supplementary gathering device having supporting arms journaled coaxially with said shaft and having driving connections extending through said arms and having a driving element on said shaft, and means including a driving element coaxial with said shaft for swinging said supporting arms.

12. In a loading machine, a body having supporting means providing mobility for said body, a shovel member adjustably mounted on the body for movement relative thereto, conveying mechanism including a conveyor having a portion supported by said shovel member and a relatively fixed portion relative to which the first mentioned portion is pivotally adjustable, mechanism for raking the material to be loaded onto the shovel, comprising a member movable relative to the body and swingable bodily about an axis adjacent the axis of movement of the first mentioned portion of the conveyor, mechanism for effecting movement of said member relative to said body including driving connections including a driving member rotatable on an axis in the same line with the axis of swinging movement of said raking mechanism, and mechanism for driving said conveying mechanism cooperating with the latter at a point in the relatively stationary portion thereof.

13. A loading machine comprising a body and supporting means for the body providing mobility therefor, a shovel member mounted on the body for movement relative thereto, a conveyor having a portion supported by the body and another portion supported by the shovel member for movement therewith and relative to the first portion, means for raking the material to be loaded onto the shovel and conveyor, supporting means for said raking means including arms extending forwardly from said body, said body having laterally disposed forwardly extending portions adjacent the upper part thereof, and means for swinging said raking means upwardly and downwardly including a transversely extending shaft supported in said forwardly extending portions and means connecting said raking means with said transversely extending shaft arranged outside said forwardly extending portions of said body, said connecting means operative to transmit motion to said arms whether the latter lie above or below said transverse shaft.

14. A loading machine comprising a body and supporting means for the body providing mobility therefor, said body having side frames each having a portion projecting forwardly from said body at the upper portion of the latter, gathering means including side arms movably supported by said side frames, a gathering roller rotating on a horizontal transversely extending axis arranged at the forward ends of said arms, means for raising and lowering said arms including arcuate racks carried by said arms at a point intermediate said roller and the pivot points of said arms, pinions engageable with said racks and rotatably supported at the forward ends of the forwardly projecting portions of the side frames, and driving connections extending through one of said side frames for said pinions.

15. In a loading machine, a body having supporting means providing mobility for said body, a shovel member adjustably mounted on the body for movement relative thereto, conveying mechanism including a conveyor having a portion supported by said shovel member and a relatively fixed portion relative to which the first mentioned portion is pivotally adjustable, mechanism for moving the material to be loaded onto the shovel comprising a member movable relative to the body and swingable bodily about an axis adjacent the axis of movement of the first mentioned portion of the conveyor, mechanism for effecting movement of said member relative to said body including driving connections including a driving member rotatable on an axis in the same line with the axis of swinging movement of said material moving mechanism, and mechanism for driving said conveying mechanism cooperating with the latter at a point in the relatively stationary portion thereof.

16. A loading machine comprising a body and supporting means for the body providing mobility therefor, said body having forwardly projecting laterally arranged frame portions adjacent the upper part thereof, said frame portions constituting the uppermost parts of said body, a power rotated shaft journaled in the forward ends of said portions, a pair of arms journaled on said body and extending forwardly beyond said shaft and supporting a rotary gathering member, actuating means for said gathering member, said arms disposed outside the space between said laterally arranged frame portions and providing an enclosure for a portion of said actuating means, operative conections between said rotary shaft and said arms for raising said arms and thereby said gathering member, conveying means supported by said body and lying between said frame portions and extending from the rear of said machine forwardly to a point adjacent said gathering member, said conveying means having an upwardly moving run occupying substantially the entire space laterally between said frame portions, and a lower run, a power rotated shaft for driving said conveying means lying beneath the lower run and carrying devices coacting directly with said lower run between the ends of the latter to drive the conveyor, and driving connections between said latter shaft and said first mentioned power rotated shaft arranged outside the vertical planes in which said upwardly moving conveyor run travels.

17. A loading machine comprising a body and supporting means for the body providing mobility therefor, said body having forwardly projecting, laterally arranged frame portions adjacent the upper part thereof, said frame portions constituting the uppermost portions of said body, a horizontal, power rotated shaft journaled in the forward ends of said portions, a pair of arms journaled on said body on an axis in a horizontal plane below the horizontal plane of said shaft, said arms extending forwardly beyond said shaft and supporting a rotary gathering member, actuating means for said gathering member, said arms disposed outside the space between said laterally arranged frame portions and providing an enclosure for a portion of said actuating means and swingable upwardly to a position in which the axis of said shaft extended will pass beneath the most adjacent portion of said arms, operative connections between said rotary shaft and said arms for raising said arms and thereby said gathering member, conveying means supported by said body and lying between said frame portions and extending from the rear of said machine forwardly to a point adjacent said gathering member, said conveying means having an upwardly moving run occupying substantially the entire space laterally between said frame portions, a power rotated shaft for driving said conveying means, and driving connections between said latter shaft and said first mentioned power rotated shaft.

18. A loading machine comprising a body and supporting means for the body providing mobility therefor, said body having forwardly projecting laterally arranged portions and supporting between said portions an endless gathering conveyor extending upwardly from a point in advance of the body supporting means, and rearwardly, said conveyor comprising upper and lower runs, driving means for said conveyor, a shovel extending forwardly and downwardly from the upper run of said gathering conveyor, a rotary gathering device, supporting arms for the gathering device pivotally mounted on said body and swinging in planes outside said laterally arranged portions of said body and supporting said gathering device for movement from positions adjacent the mine bottom in advance of the shovel to elevated positions with the bottom of said gathering device above the tops of said laterally arranged body portions and driving connections for said gathering device driven by said conveyor driving means and having portions between said laterally arranged body portions and portions outside said laterally arranged body portions, the portions between said laterally arranged body portions lying underneath the lower run of the gathering conveyor.

19. A loading machine comprising a body and supporting means for the body providing mobility therefor, said body having side frames providing portions projecting forwardly beyond said supporting means, a gathering conveyor arranged between said side frames comprising an upper, upwardly and rearwardly traveling run and a lower, downwardly and forwardly traveling run, a shovel up which material may be moved to said gathering conveyor, a cooperating gathering device having supporting arms journaled outside said side frames and swingable upwardly about an axis below and to the rear of the tops of the forward ends of said side frame portions, to a position in which a line connecting the forward portions of the tops of the side frames passes beneath said arms, and means for driving said cooperating gathering device, for effecting swinging of said arms and for driving said conveyor rotating on alined axes extending beneath the conveyor whereby large blocks of material may be moved along said conveyor irrespective of the position of the cooperating gathering device and including a driving element common to the drive of said gathering device swinging and driving means.

20. A loading machine comprising a body and supporting means for the body providing mobility therefor, said body having side frames providing portions projecting forwardly beyond said supporting means, a gathering conveyor arranged between said side frames comprising an upper, upwardly and rearwardly traveling run and a lower, downwardly and forwardly traveling run, said side frames coacting to maintain material against lateral escape from a portion of said conveyor, a cooperating gathering device having supporting arms journaled outside said side frames and swingable upwardly to position said cooperating gathering device above the planes of the tops of said side frames, and means for driving said cooperating gathering device, for effecting swinging of said arms and for driving said conveyor including connections respectively arranged outside said side frames, within one of said side frames, and between said side frames below the lower run of the conveyor, and common motor operated actuating means for said connections.

FRANK A. HALLECK.